INVENTORS
RAYMOND W. FAIVRE
DONALD E. WALDECKER

BY Sughrue, Rothwell, Mion, Zinn & Macpeak
ATTORNEYS

United States Patent Office 3,564,507
Patented Feb. 16, 1971

3,564,507

ASYNCHRONOUS INTERFACE FOR USE BETWEEN A MAIN MEMORY AND A CENTRAL PROCESSING UNIT

Raymond W. Faivre and Donald E. Waldecker, Endicott, N.Y., assignors to International Business Machines Corporation, Armonk, N.Y., a corporation of New York Filed Apr. 10, 1968, Ser. No. 720,124
Int. Cl. G06f *3/04*
U.S. Cl. 340—172.5 9 Claims

ABSTRACT OF THE DISCLOSURE

An asynchronous interface which selectively interrupts the clock pulses applied to a central processing unit thereby permitting a high speed central processing unit (CPU) to operate with a low speed main memory having a relatively long cycle time or with a plurality of main memories having different cycle times. The operation of the CPU is controlled by clock pulses. When the CPU selects a main memory and requests data at a specified address in the memory so that the data can be processed, a BUSY signal is generated for a predetermined following portion of the selected memory cycle. The BUSY signal interrupts the clock pulses so that another selection of the memory cannot be made until the memory is ready to accept the address of the data to be used in the next request at which time the clock pulses are again applied to the CPU. Since the access time of the memory may be so long that the requested data is not available at the memory output when the CPU is ready to accept and process the data, the clock pulses are interrupted for a predetermined time until the data is available, at which time an ADVANCE signal is generated by the memory to indicate the data will be available the next time the CPU is able to accept this data. By the use of memory-generated BUSY and ADVANCE signals to interrupt the CPU clock pulses, a high speed CPU may be used with memories having different cycle times and different access times without the need for changing the control logic in the CPU.

BACKGROUND OF THE INVENTION

Field of the invention

This invention relates to the field of digital data processing.

Description of the prior art

In the prior art, a central processing unit (CPU) was designed so that the timing of the CPU control logic matched the speed of the main memory which was to operate with the CPU. If a faster main memory were later used with the CPU, the CPU could not take advantage of the faster memory. If a slower memory were later to be used with the CPU, the CPU logic would have to be changed to accommodate the longer access time and longer cycle time of the memory. Furthermore, the CPU could not operate with plural memories each having different access and cycle times without the CPU logic being specifically designed to accommodate these different times.

SUMMARY OF THE INVENTION

The broad object of the invention is to provide an asynchronous interface between the main memory and the CPU so that a very high speed CPU can be used with a relatively slow main memory. The main memory generates indication signals at different points within its cycle of operation to indicate to the CPU that the memory will not be able to perform a required operation at a particular time in a cycle of the CPU. These indication signals freeze the CPU clocks so that the cyclic operation of the CPU instruction sequencer is inhibited. When the memory is ready to perform the required operation, the CPU clocks are started again so that the required operation will be performed at the next permissible time in a CPU cycle.

Such an asynchronous interface renders the CPU instruction control logic independent of the main memory access and cycle time, thereby permitting the CPU to be used with a plurality of different memories, each having different access and cycle times. Furthermore, since the CPU can be designed to operate at very fast cycle times, instruction execution time can be reduced when the CPU is used with a memory having a cycle time which is faster than any available at the time the CPU is designed. In addition, this asynchronous interface reduces the number of instruction control states required for a particular memory as compared to the prior art where the instruction sequencer had to operate continuously even though the memory was not able to perform a required operation as soon as the CPU requested the operation.

The foregoing and other objects, features and advantages of the invention will be apparent from the following more particular description of a preferred embodiment of the invention, as illustrated in the accompanying drawings.

BRIEF DESCRIPTION OF A PREFERRED EMBODIMENT

Figure 1:
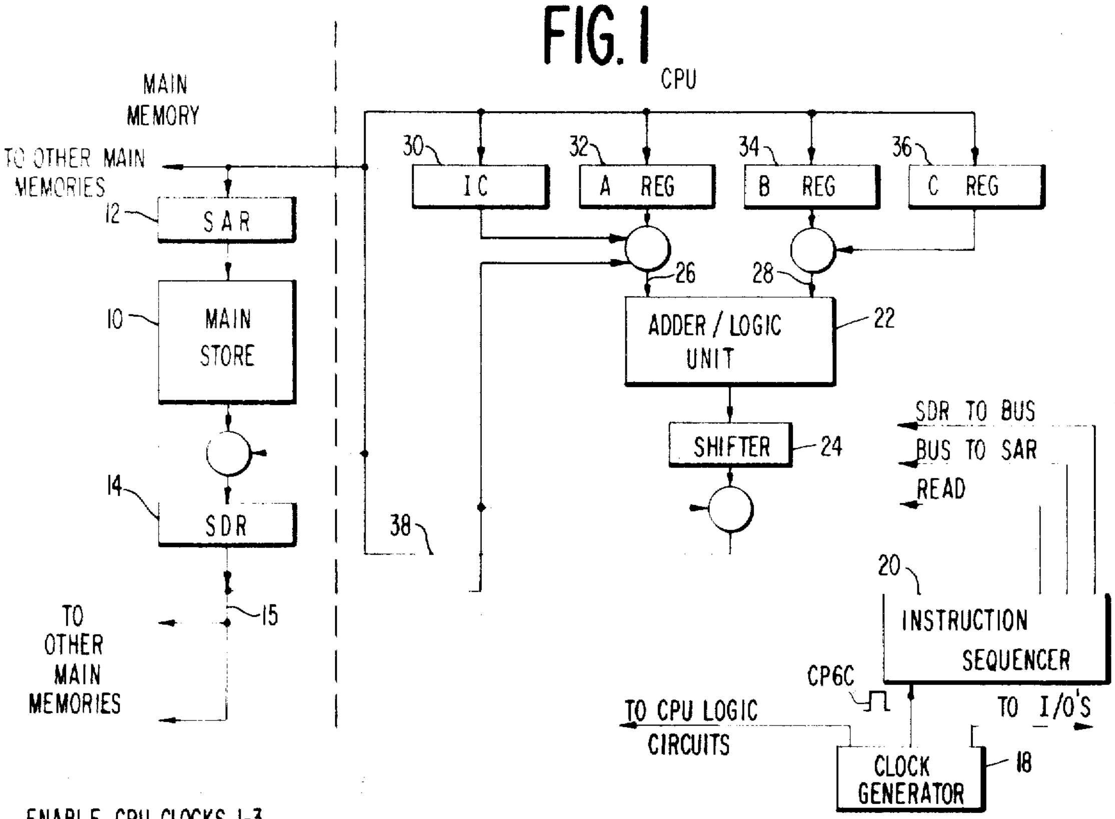
FIG. 1 is a simplified block diagram of a data processing system with which the asynchronous interface may be used.

In a typcial parallel digital data processing system as illustrated in FIG. 1, the main memory consists of a main store 10 containing data and instructions, a storage address register (SAR) 12 for holding the addresses of desired information in the main store, and a storage data register (SDR) 14 for holding information read out of the main store. Information is transferred to the CPU via a bus 15 to which other main memories may be connected in common through suitable OR circuits.

The CPU consists of a clock pulse generator 18 which provides clock pulses for the cyclic operation of an instruction sequencer 20 and also to control the operation of various CPU logic circuits and input/output (I/O) logic circuits. An adder/logic unit 22 and a shifter 24 operate upon data applied to the inputs 26 and 28. A sequentially operated instruction counter (IC) 30 specifies the addresses of instructions in the main store 10. The registers 32, 34 and 36 store data received from the main bus 38 which is connected to receive data both from the SDR bus 15 and from the outputs of the adder/logic unit 22 and shifter 24. The circles represent OR circuits.

Figure 2:
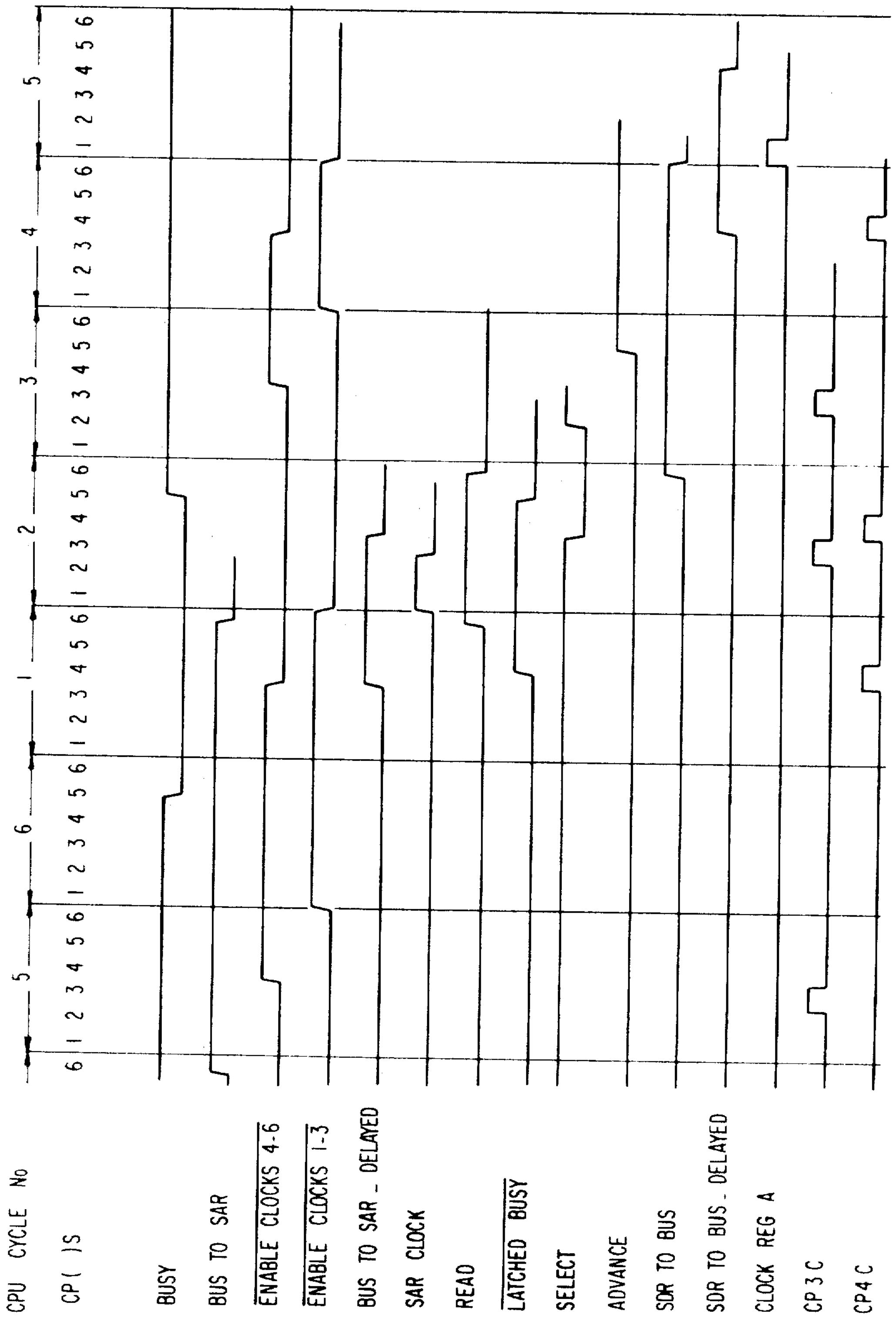
FIG. 2 is a timing chart illustrating the timing of the indication signals and the various control signals generated by the CPU and memory to produce the asynchronous interface.

There will now be presented a description of a typical operation of the asynchronous interface with the generalized data processing system illustrated in FIG. 1. Reference should be made to FIG. 2 which illustrates the relative timing of the various signals and also to FIGS. 3–10 which show the logic circuits for generating the various signals.

We will assume that a CPU cycle is 400 nanoseconds long and is divided into 6 equal time intervals by 6 clock pulses CP1C, CP2C . . . CP6C. A memory cycle is defined as being equal to 6 CPU cycles, or 2.4 microseconds. A CPU cycle is defined as the time required to change the state of the instruction sequencer 20, add the contents of two registers in the adder/logic unit 22, and place the result back in a register.

Main store access time is defined as the time from the initiation of a memory cycle by a $\overline{\text{SELECT}}$ signal until the output data is stable in SDR 14. The main store cycle time of 2.4 microseconds is the minimum time required between successive $\overline{\text{SELECTS}}$.

We will also impose the following rules upon the main memory. The SAR 12 must be stable for 2.2 microseconds after a $\overline{\text{SELECT}}$ is given by the CPU. The data from the main store is not available in the SDR until 800 nanoseconds after a $\overline{\text{SELECT}}$.

Furthermore, the instruction sequencer 20 changes its instruction state during CP6C on each CPU cycle. Let us now look at the timing chart of FIG. 2 and logic circuits of FIGS. 3–10.

Figures 3, 5:
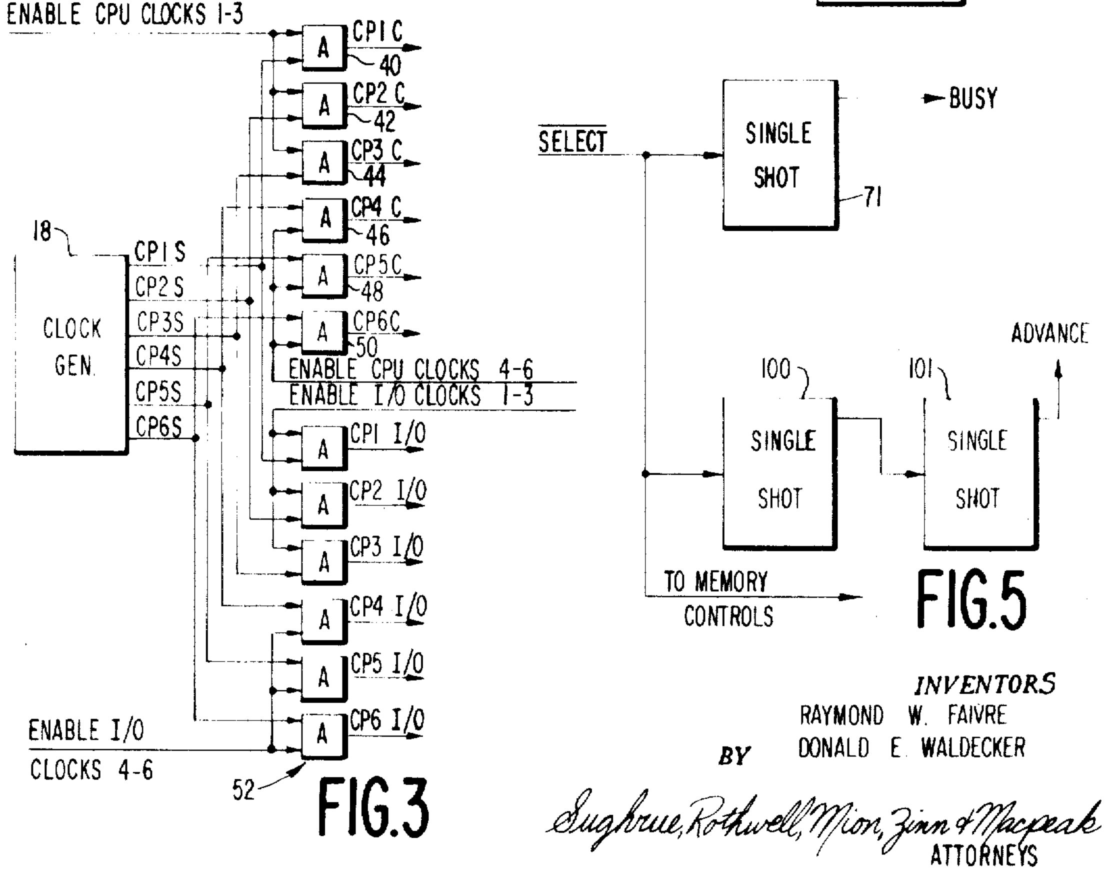
FIGS. 3–10 illustrate the the various logic circuits for producing the signals illustrated in FIG. 2.

In FIG. 3, the clock generator 18 runs continuously to produce 6 equally spaced clock pulses CP1S . . . CP6S every 400 nanoseconds which is equal to the time of one CPU cycle. These six clock pulses are applied to six corresponding AND gates 40, 42, 44, 46, 48 and 50. AND gates 40, 42 and 44 will produce CPU clock pulses CP1C–CP3C only if the second input of each of the AND gates has applied to it the signal ENABLE CPU CLOCKS 1–3. Similarly, AND gates 46, 48 and 50 will produce CPU clock pulses CP4C–CP6C only if their second inputs have applied thereto the signal ENABLE CPU CLOCKS 4–6. AND gates 52 function in a similar manner to produce I/O clock pulses CP1 I/O–CP6 I/O.

Let us assume that the instruction sequencer 20 generates a BUS TO SAR signal at CP6C time of CPU cycle 4. We will also assume that the SAR is not available because of the slow cycle time of the memory and, therefore, a BUSY signal is also present or up. From FIG. 4, it is seen that the coincidence of these two signals causes an AND gate 54 to produce a signal which is fed through an OR circuit 56 to one input of an AND gate 58. The other input of AND gate 58 is a clock generator pulse CP3S in CPU cycle 5. Therefore, at time CP3S, a latch 60 is set to raise line 62 and lower line 64. In its lowered condition, line 64 produces a $\overline{\text{ENABLE CPU CLOCKS 4–6}}$ signal, or in other words, DISABLE CLOCKS 4–6. Looking at FIG. 3, we then see that the AND gates 46, 48, and 50 are disabled so that clock pulses CP4C–CP6C in CPU cycle 5 are not produced. Furthermore, at CP6S time in CPU cycle 5, the AND gate 66 sets a latch 68 so that the output line 70 is down, thereby generating $\overline{\text{ENABLE CPU CLOCK 1–3}}$ to stop CPU clocks CP1C–CP3C in CPU cycle 6. This result can be seen from the fact that AND gates 40, 42 and 44 in FIG. 3 are now disabled.

Consequently, all the CPU clocks CP1C–CP6C are stopped so that the instruction sequencer 20 is no longer being advanced. However, in CPU cycle 6 the BUSY signal falls because the single shot 71 in FIG. 5 has timed out, indicating that the main memory is approaching the end of the 2.4 microsecond cycle. When the BUSY signal falls, the output of AND gate 54 in FIG. 4 drops as does the output of OR gate 56, but the output of inverter 72 rises to condition one input of an AND gate 74 whose output is connected to the reset terminal of latch 60. Consequently, at CP3S time of cycle 1, the output of AND gate 74 rises to reset latch 60, thereby raising line 64 to generate a signal ENABLE CPU CLOCKS 4–6, which signal conditions the AND gates 46, 48 and 50.

Consequently, clock generator pulses CP4S–CP6S will produce the CPU clock pulses CP4C–CP6C in CPU cycle

1. Furthermore, the signal on line 64 also conditions an AND gate 76 so that at CP6S time in cycle 1, latch 68 is reset to produce an up signal on line 70, thereby generating the signal ENABLE CPU CLOCKS 1–3, which signal as can be seen from FIG. 3 permits clock pulses CP1C–CP3C to be generated in CPU cycle 2.

Therefore, at CP6C time in cycle 1, the instruction sequencer 20 will change state and thereby lower the BUS TO SAR signal. However, as seen from the logic circuit of FIG. 6, the CP4C clock pulse of cycle 1 sets a latch 80 to raise the output line 82 and provide a BUS TO SAR DELAYED signal which falls at the next CP4C pulse if a BUS TO SAR signal is not present at the same time.

Figures 4, 6, 7:
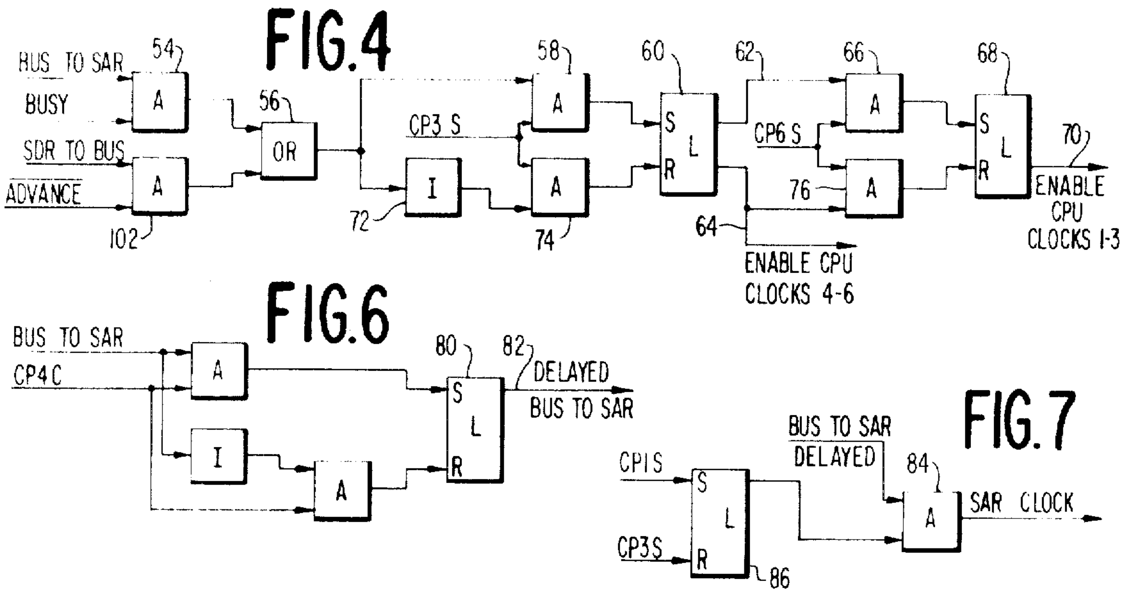
Figure 8:
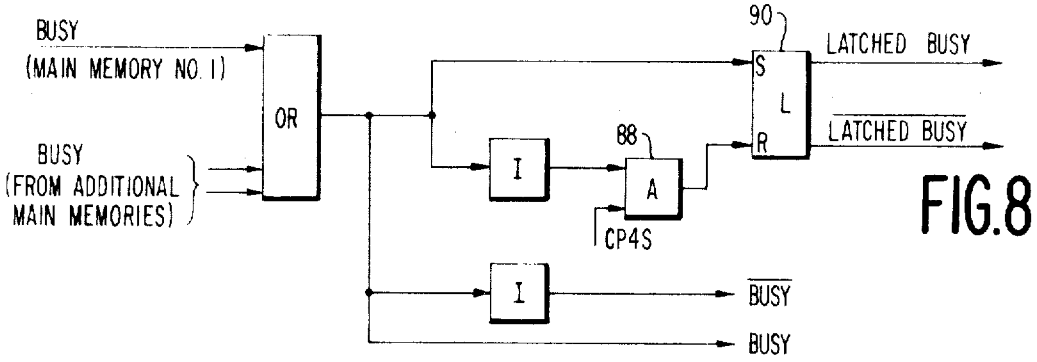
Figure 9:
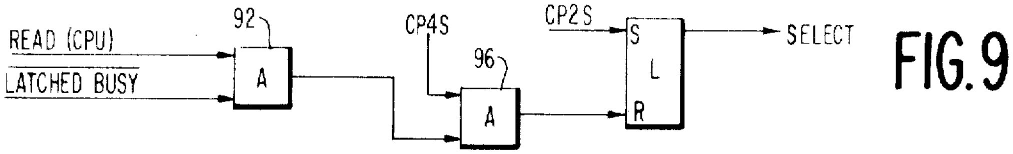

The BUS TO SAR DELAYED signal is applied to one input of an AND gate 84 in FIG. 7. The other input of AND gate 84 is conditioned by the set output of a latch 86 which is turned on at CP1S time and turned off at CP3S time. Consequently, during clock generator pulses CP1S and CP2S of cycle 2, a SAR CLOCK pulse is produced. This is a control pulse which allows the address in SAR 12 in FIG. 1 to be changed. It can be seen that the timing of BUSY is such that the clocks are enabled and the SAR CLOCK pulse is allowed to occur such that the rules for using the memory are not violated. The SAR CLOCK pulse can be applied to suitable gating means, not shown, to accomplish this function.

Therefore, at the beginning of CPU cycle 2 there is a new address in SAR 12. As seen from FIG. 8, at CP4S time in cycle 1 after BUSY had dropped, the output of an AND gate 88 reset a latch 90 to produce a $\overline{\text{LATCHED BUSY}}$ signal.

Let us now assume that at the beginning of cycle 2 the CPU sequencer 20 generates a READ signal. As seen from FIG. 9, the output of an AND gate 92 will now rise to condition one input of another AND gate 96 which will produce an output at CP4S time of cycle 4, which output resets a latch 98 to drop the SELECT signal. It is this fall of the SELECT signal, i.e., $\overline{\text{SELECT}}$, which triggers the single shot 71 in FIG. 5, thereby producing the BUSY signal whose duration is determined by the single shot switching time which is designed in accordance with the length of the memory cycle. The $\overline{\text{SELECT}}$ signal also causes memory control circuits to initiate a memory cycle.

The foregoing description describes the manner in which the BUSY signal is used to stop the CPU clocks of a high speed CPU thereby stopping the instruction sequencer until the slower main memory can catch up with the CPU. The BUSY signal rises within 200 nanoseconds after the memory cycle is initiated for the typical 2.4 microsecond memory which has been assumed and falls somewhat less than two CPU cycles (60–800 nanoseconds) before the next $\overline{\text{SELECT}}$ can be given. If the memory cycle were 2.8 rather than 2.4 microseconds, the BUSY single shot 71 would be adjusted to provide a pulse 400 nanoseconds longer than the assumed BUSY pulse.

Let us now discuss the manner in which the ADVANCE signal compensates for the slower access time of a main memory. Let us assume that in CP6C time of cycle 2 the instruction sequencer 20 generates an SDR TO BUS signal requesting that the contents of the SDR 14 be transferred to BUS 15. Since the access time of the main memory is assumed to be 800 nanoseconds, the memory cannot perform this request, because the single shot 100 in FIG. 5 has not yet timed out to fire single shot 101 which provides an ADVANCE signal. The ADVANCE signal rises somewhat less than one CPU cycle (200–400 nanoseconds) before the SDR is stable. For the typical timing assumed, ADVANCE rises 400–600 nanoseconds after $\overline{\text{SELECT}}$ and the access time is 800 nanoseconds. A memory with a 1200 nanosecond access time would require ADVANCE to rise 800–1000 nanoseconds after $\overline{\text{SELECT}}$. Similarly, ADVANCE is adjusted for use with memories of varying access time. Looking at FIG. 4, we see that the absence of an ADVANCE signal or AD- $\overline{\text{VANCE}}$ conditions one input of an AND gate 102 so the output of the AND gate is raised when SDR TO BUS occurs. The output of the AND gate 102 passes through OR circuit 56 to condition AND gate 58 so that CPU clocks CP4C–CP6C are disabled at CP3S time in cycle 3 and CPU clocks CP1C–CP3C are disabled at CP6S time, all as previously described in connection with the BUSY signal.

Figure 10:
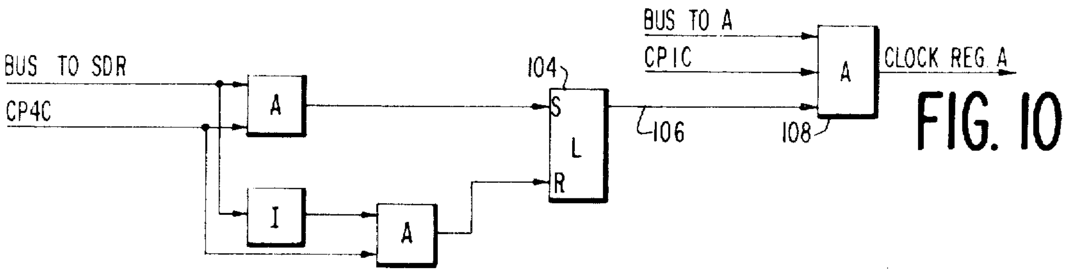

When the ADVANCE signal comes up by virtue of the timing out of the single shot 100 in FIG. 5, the logic circuit of FIG. 4 operates to ENABLE or start the CPU clocks in the manner described in connection with the operation of the BUSY signal. Since ADVANCE comes up after CP4S in cycle 3, the CPU clocks do not start running until CP4S time in cycle 4. At CP6C time in cycle 4, since the CPU clocks are now running, the sequencer will drop SDR to BUS and enter another instruction state. However, as shown in FIG. 10, BUS TO SDR is ANDed with CP4C time in cycle 4 to set a latch 104 to produce on output line 106 an SDR TO BUS DELAYED signal which conditions one input of an AND gate 108. Another input to AND gate 108 is conditioned by the signal BUS TO A from the instruction sequencer to produce at time CP1C in cycle 5 a CLOCK A REG signal which actually gates the contents of the SDR to the A register 32 in the CPU. It can be seen from the timing rules defined previously that because of the 800 nanoseconds memory access time, the first time that the contents of the SDR can be transferred is at CP1S time of cycle 5. Latch 104 is reset at the next CP4C clock.

From the foregoing description, it can be seen that the ADVANCE signal permits a very high speed CPU to communicate with a main memory having a slow access time. This result is accomplished by stopping the CPU clocks until the data in the SDR is sufficiently stable to be transferred to the CPU registers. Even though this description relates to the transfer of data between a main memory and the CPU, it is to be understood that corresponding instructions can be generated for transferring data between input/output devices and the CPU or memory.

While the invention has been particularly shown and described with reference to a preferred embodiment thereof, it will be understood by those skilled in the art that various changes in form and details may be made therein without departing from the spirit and scope of the invention.

What is claimed is:

1. An asynchronous interface for use between a central data processing unit and its main memory means in a data processing system including clock pulse generator mean for providing clock pulses to operate said central data processing unit in conjunction with said main memory means to effect transfer of date between said main memory means and said central processing unit, said asynchronous interface comprising:

(a) means associated with said main memory means for generating an indication signal indicating that said main memory means is engaged in a cycle of operation which must be completed before a predetermined cycle of operation of said central data processing unit can be successfully entered, and (b) means responsive to said indication signal for disabling said clock pulse generator means before entry of said central data processing unit into said predetermined cycle of operation to interrupt the flow of clock pulses to said central processing unit, so that the operation of said central data processing unit is stopped until said main memory means is again ready to operate in conjunction with said central processing unit.

2. An asynchronous interface according to claim 1 wherein said indication signal generating means is responsive to a request from said central processing unit to generate as said indication signal a BUSY signal for indicating that said main memory means will not be available for a predetermined time, dependent on the cycle time of said memory means, to receive and store data which may be ready to be sent to said main memory means by said central data processing unit, and means responsive to the termination of said BUSY signal after said predetermined time for enabling said clock pulse generator means to provide clock pulses to operate said central processing unit.

3. An asynchronous interface according to claim 1 wherein said indication signal generating means is responsive to a request from said central processing unit to generate as an indication signal an $\overline{\text{ADVANCE}}$ signal indicating that said main memory means is not yet ready to transmit to said central data processing unit data which has been requested by said central data processing unit, and further comprising means for generating an ADVANCE signal corresponding to the absence of said indigcation signal to indicate said main memory means is ready to transmit requested data to said central data processing unit.

4. An asynchronous interface according to claim 1 wherein said main memory means comprises data storage means, means for controlling the address at which data will be stored in said storage means, and register means for temporarily storing data read out of said storage means; and wherein said central data processing unit comprises execution means for performing logical operations on data, means for transmitting data from said register means to said execution means and means for transmitting data from said execution means to said storage means, the further improvement comprising means for generating as said indication signal a BUSY signal indicating that said storage means is not yet available to accurately control the address at which said data from said execution means is to be stored in said storage means.

5. An asynchronous interface according to claim 1 wherein said main memory means comprises data storage means, means for controlling the address at which data will be stored in said storage means, and register means for temporarily storing data read out of said storage means; and wherein said central data processing unit comprises execution means for performing logical operations on data, means for transmitting data from said register means to said execution means and means for transmitting data from said execution means to said storage means, the further improvement comprising means for generating as said indication signal and $\overline{\text{ADVANCE}}$ signal indicating that said register means is not yet ready to transfer data to said means for transmitting data from said register means to said execution means.

6. An asynchronous interface according to claim 1 wherein said central data processing unit includes instruction sequencer means operated by said clock pulses and further comprising means responsive to said indication signal for preventing said clock pulses from operating said instruction sequencer means.

7. A method of asynchronously operating a central processing unit in a data processing system including a main memory for said central processing unit wherein the operation of said central processing unit is under the control of periodic clock pulses and wherein data is adapted to be transferred between said central processing unit and said main memory during the operation of said central processing unit, the method comprising:

(a) normally applying to said central processing unit said clock pulses for permitting the transfer of data between said central processing unit and said main memory, and (b) interrupting the application of said clock pulses to said central processing unit when said main memory is engaged in a cycle of operation which must be completed before a predetermined cycle of operation of said central processing unit can be successfully entered.

8. A method of asynchronously operating a central processing unit according to claim 7 further comprising interrupting the application of said clock pulses to said central processing unit for a period of time dependent upon the cycle time of said main memory.

9. A method of asynchronous operating a central processing unit according to claim 7 further comprising interrupting the application of said clock pulses to said central processing unit for a period of time dependent upon the access time of said main memory.

References Cited

UNITED STATES PATENTS

| | | | |
|---|---|---|---|
| 3,231,863 | 1/1966 | Vlfsparre | 340—172.5 |
| 3,242,467 | 3/1966 | Lamy | 340—172.5 |
| 3,247,492 | 4/1966 | Furlong | 340—172.5 |
| 3,253,262 | 5/1966 | Wilenitz et al. | 340—172.5 |
| 3,292,153 | 12/1966 | Barton et al. | 340—172.5 |
| 3,460,098 | 8/1969 | De Blauw | 340—172.5 |

PAUL J. HENON, Primary Examiner

P. R. WOODS, Assistant Examiner